US010189641B2

(12) United States Patent
Hognaland

(10) Patent No.: US 10,189,641 B2
(45) Date of Patent: Jan. 29, 2019

(54) STORAGE SYSTEM

(71) Applicant: Jakob Hatteland Logistics AS, Nedre Vats (NO)

(72) Inventor: Ingvar Hognaland, Nedre Vats (NO)

(73) Assignee: Autostore Technology AS, Nedre Vats (NO)

( * ) Notice: Subject to any disclaimer, the term of this patent is extended or adjusted under 35 U.S.C. 154(b) by 372 days.

(21) Appl. No.: 14/442,410

(22) PCT Filed: Nov. 4, 2013

(86) PCT No.: PCT/EP2013/072887
§ 371 (c)(1),
(2) Date: May 13, 2015

(87) PCT Pub. No.: WO2014/075937
PCT Pub. Date: May 22, 2014

(65) Prior Publication Data
US 2016/0272421 A1  Sep. 22, 2016

(30) Foreign Application Priority Data

Nov. 13, 2012 (NO) .................................. 20121335

(51) Int. Cl.
*B65G 1/04* (2006.01)
*B65G 1/06* (2006.01)

(52) U.S. Cl.
CPC ......... *B65G 1/0464* (2013.01); *B65G 1/0478* (2013.01); *B65G 1/06* (2013.01); *B65G 2201/0258* (2013.01)

(58) Field of Classification Search
CPC ............... B65G 1/0464; B65G 1/0478; B65G 2201/0258
See application file for complete search history.

(56) References Cited

U.S. PATENT DOCUMENTS 1,369,393 A * 2/1921 Burgess ............... B65G 1/0464
414/281
3,730,358 A * 5/1973 Oji ....................... B65G 1/0464
414/460
(Continued)

FOREIGN PATENT DOCUMENTS

CN        1090247 A    8/1994
CN        1054823 C    7/2000
(Continued)

OTHER PUBLICATIONS

International Search Report in corresponding PCT Application No. PCT/EP2013/072887 dated Jan. 23, 2014 (1 page).

(Continued)

Primary Examiner — James Keenan
(74) Attorney, Agent, or Firm — Osha Liang LLP

(57) ABSTRACT

A storage system includes a first grid structure of storage cells, each cell being arranged to accommodate a vertical stack of storage bins, and the first grid structure having a top level. The system further includes a first vehicle, arranged to move horizontally at the top level of the first grid structure, and a bin lift device, arranged to convey a bin in a vertical direction between the top level of the grid structure and a delivery station. The first vehicle is further arranged to receive a storage bin from a storage cell at the top level of the first grid structure and to deliver the storage bin to the bin lift device. The bin lift device is arranged to receive a bin from the vehicle at the top level of the first grid structure and to convey the bin to the delivery station.

12 Claims, 8 Drawing Sheets

(56) References Cited

U.S. PATENT DOCUMENTS

| | | | | |
|---|---|---|---|---|
| 4,088,232 | A | * | 5/1978 | Lilly .................... B65G 1/0464 414/282 |
| 4,834,607 | A | | 5/1989 | Back |
| 6,059,509 | A | * | 5/2000 | Ostwald ................ G11B 17/24 414/277 |
| 7,101,139 | B1 | * | 9/2006 | Benedict .............. B65G 1/0478 414/281 |
| 9,682,822 | B2 | * | 6/2017 | Lindbo .................. B65G 1/137 |
| 9,850,066 | B2 | * | 12/2017 | Salichs .................. B65G 1/026 |

FOREIGN PATENT DOCUMENTS

| | | |
|---|---|---|
| CN | 101610960 A | 12/2009 |
| CN | 201424266 Y | 3/2010 |
| CN | 102633076 A | 8/2012 |
| DE | 10 2009 017241 A1 | 10/2010 |
| DE | 10 2009 051 800 A1 | 5/2011 |
| EP | 0 314 837 A1 | 5/1989 |
| EP | 1157947 A2 | 11/2001 |
| EP | 1626012 A1 | 2/2006 |
| GB | 2211822 A | 7/1989 |
| JP | S57-0124503 A | 1/1981 |
| JP | S57-0209109 A | 12/1982 |
| JP | 2000-327111 A | 11/2000 |
| JP | 2008-534406 A1 | 8/2008 |
| JP | 2011-162343 A | 8/2011 |
| NO | 317366 B1 | 10/2004 |
| WO | 98/49075 A1 | 11/1998 |

OTHER PUBLICATIONS

Office Action issued in the counterpart Chinese Patent Application No. 201380059159.4, dated Dec. 15, 2015 (5 pages).

Notice of Reasons for Rejection in corresponding Japanese application No. 2015-541087, dated Sep. 12, 2017 (13 pages).

* cited by examiner

STORAGE SYSTEM

TECHNICAL FIELD

The present invention relates to the technical field of logistics and storage systems.

More specifically the invention relates to a storage system which comprises a first grid structure of storage cells, each storage cell being arranged to accommodate a vertical stack of storage bins, the first grid structure having a top level. The system further comprises a first vehicle, arranged to move horizontally at the top level of the first grid structure, and a bin lift device, arranged to convey a bin in a vertical direction between the top level of the grid structure and a delivery station. The first vehicle is further arranged to receive a storage bin from a storage cell at the top level of the first grid structure and to deliver the storage bin to the bin lift device. Moreover, the bin lift device is arranged to receive a bin from the vehicle at the top level of the first grid structure and to convey the bin to the delivery station.

BACKGROUND

The Applicant's already known AutoStore system is a storage system of the type mentioned in the introduction. The AutoStore system comprising a three dimensional storage grid containing storage bins that are stacked on top of each other to a certain height. The storage grid is constructed as aluminium columns interconnected by top rails. A number of vehicles, or robots, are arranged on the top rails. Each vehicle is equipped with a lift for picking up, carrying, and placing bins that are stored in the storage grid.

Such a storage system of the background art has been illustrated in FIG. 1. The storage system 10 comprises a grid structure 20 of storage cells. Each cell is arranged to accommodate a vertical stack of storage bins 30. The grid structure has a top level.

The storage system 10 further comprises a vehicle 40, which is arranged to move at the top level of the grid structure and also arranged to receive a bin from a storage cell at the top level of the grid structure. The storage system 10 may include a plurality of such vehicles 40, as illustrated.

The storage system 10 further comprises a bin lift device 50. The bin lift device 50 is arranged to receive a bin from the first vehicle 40 at the top level of the first grid structure and to convey the bin down in a vertical direction to a delivery station, or port, 60. The storage system 10 may include a plurality of such lift devices 50 and ports 60, as illustrated.

An object of the invention is to provide an improved storage system with respect to at least one of performance, capacity, utilization of area, and flexibility.

SUMMARY

The invention has been defined in the patent claims.

More specifically, the invention provides a system as set forth in the introduction, which further comprises a second grid structure of storage cells at a different vertical level than the first grid structure, and a second vehicle that is arranged to move horizontally at the top level of the second grid structure. The second vehicle is further arranged to receive a storage bin from a storage cell at the top level of the second grid structure and to deliver the storage bin to the bin lift device. The bin lift device is further arranged to convey a bin in a vertical direction between the top level of the first grid structure and the second grid structure.

Further possible features, including exemplary aspects, structure and operation of various embodiments, have been described in detail below with reference to the accompanying drawings. In the drawings, like reference numbers indicate identical or functionally similar elements.

DETAILED DESCRIPTION

Figure 1:
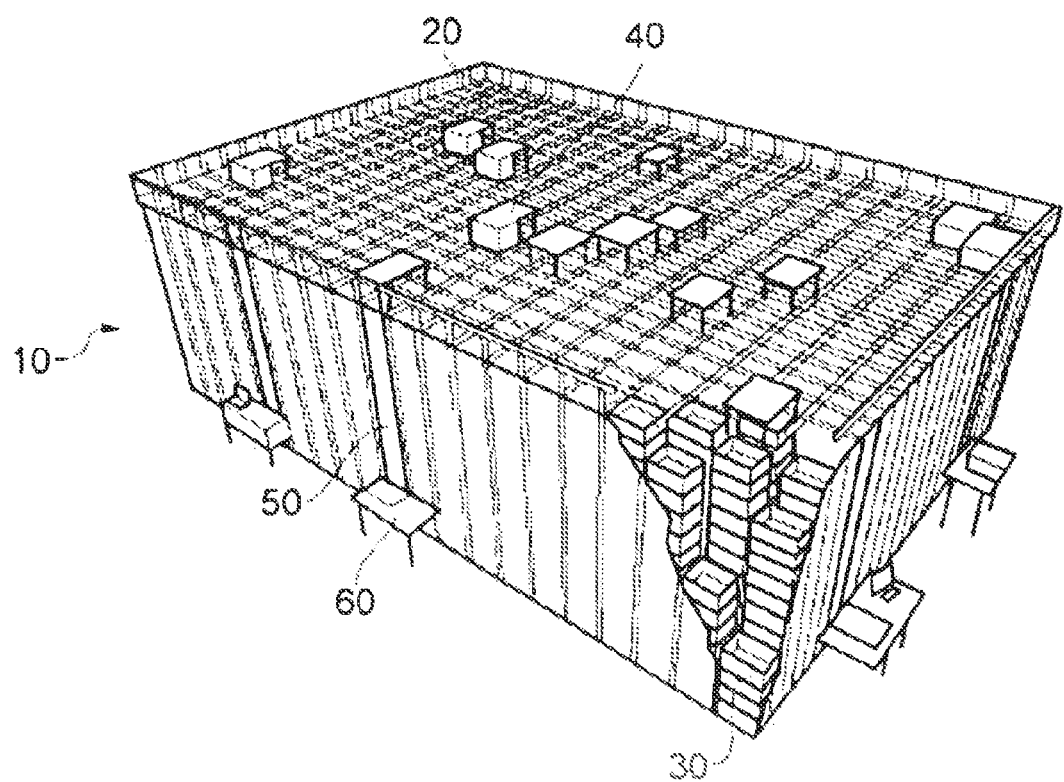
FIG. 1 is a schematic, partly cut perspective view of a storage system according to the background art.

FIG. 1 is a schematic, partly cut perspective view of a storage system according to the background art, which has already been referred to in the background section.

Figure 2:
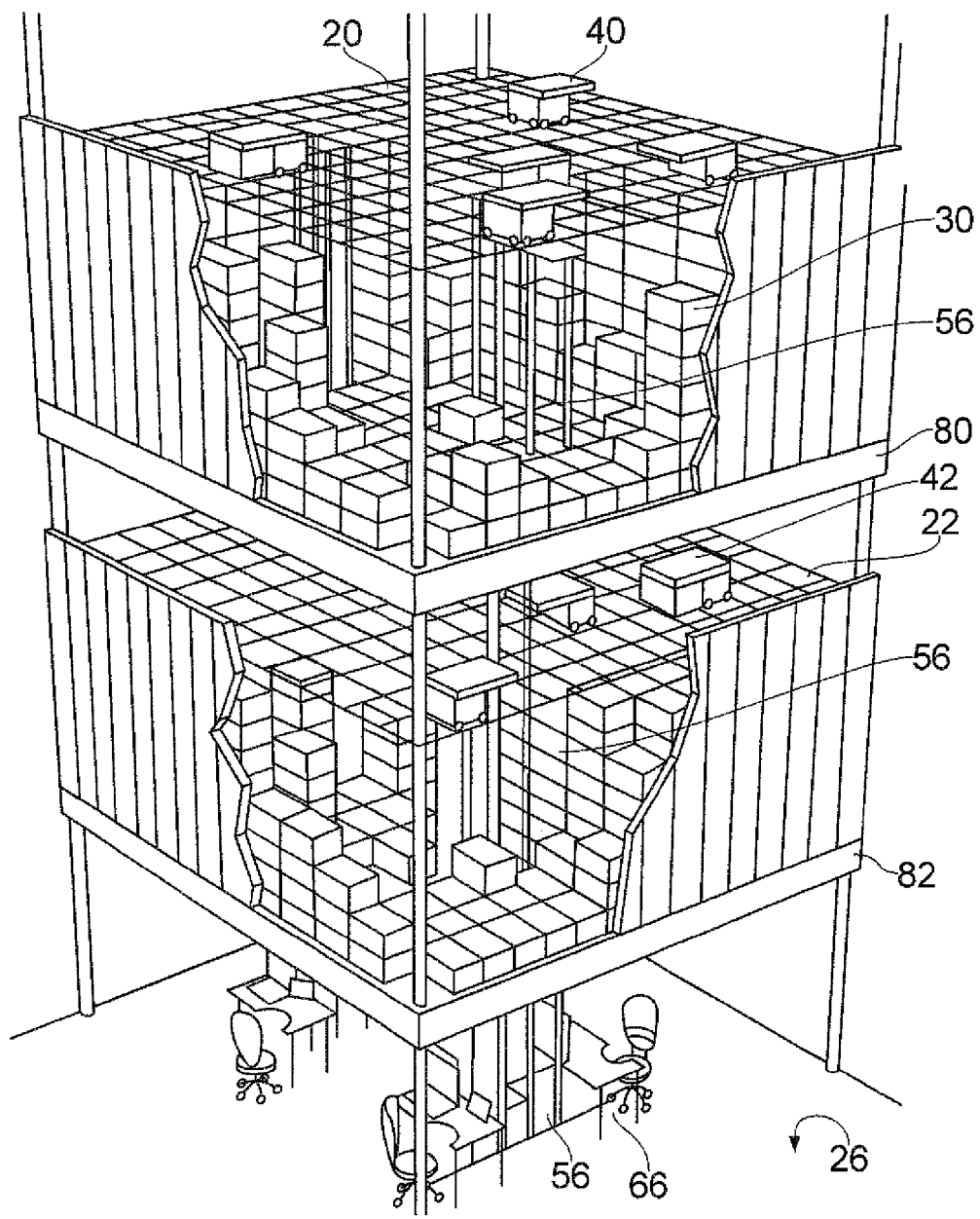
FIG. 2 is a schematic, partly cut perspective view illustrating certain aspects of a storage system.

FIG. 2 is a schematic, partly cut perspective view illustrating certain aspects of a storage system;

The storage system includes a first, upper grid structure of storage cells, arranged on an upper floor 80. Each storage cell is arranged to accommodate a vertical stack of storage bins. The first grid structure has a top level 20.

A first vehicle 40 is arranged to move at the top level 20 of the upper grid structure and arranged to receive a storage bin from a storage cell at the top level 20. A plurality of such vehicles may be arranged on the top level 20 of the upper grid structure, as appears from FIG. 2.

At least one vertical bin lift device is arranged in the system. One such bin lift device has been shown at 56. It is arranged to receive a bin from the vehicle at the top level of the upper grid structure 20 and to convey the bin down in a vertical direction to a delivery station 66, which in this example is arranged at the ground floor in the building wherein the storage system is installed. The inter-grid bin lift device 56 is arranged to deliver bins to an operator at the delivery station 66 arranged on a ground floor 26. The delivery station 66 may also receive bins from the operator and deliver them to the inter-grid bin lift device 56.

The storage system further comprises a lower grid structure of storage cells on a different vertical level than the first grid structure. In this example the lower grid structure has a top level 22 and is arranged below the upper grid structure. The lower grid structure may e.g. be a main storage grid structure.

Vehicles of the kind previously described are arranged to move at the top level of both the upper and the lower grid structure. Each vehicle is arranged to receive a storage bin from a storage cell at the top level of the respective grid structure.

Each inter-grid bin lift device, such as the inter-grid bin lift device 56, is arranged to receive a storage bin from the vehicle at the top level of the upper grid structure and to convey the storage bin in a vertical direction to the top level of the lower grid structure. The inter-grid bin lift device 56 is further arranged to convey the storage bin in a vertical direction to the delivery station 66.

The inter-grid bin lift device 56 is further arranged to receive a storage bin from the vehicle at the top level 22 of the lower grid structure and to convey the storage bin in a vertical direction to the top level 20 of the upper grid structure.

The system may also include at least one additional inter-grid bin lift device, which is not necessarily connected to a delivery station, and which is arranged to receive a storage bin from the vehicle at the top level of any one of the upper or lower grid structures and to convey the storage bin in a vertical direction to the top level of any one of the upper or lower grid structures.

The system may also include any number of bin lift devices which do not extend between grids on different levels (i.e., which are not inter-grid bin lift devices), but which merely provides access from one particular grid to a delivery station.

In the embodiment illustrated in FIG. 2, bin lift devices such as the bin lift device 56 are each connected to a delivery station 66 which is arranged below the lowermost grid structure, since the lower grid structure is on a higher vertical level than the delivery station 66. However, alternatively or in addition, any number of bin lift devices may be connected to a delivery station which is installed on any side of the grid structures, on any grid structure level. Delivery station(s) may in certain circumstances even be located at a level above the top of the uppermost grid structure.

When a vehicle delivers a storage bin to a bin lift, the bin lift exchanges this bin with the previously used bin and the vehicle returns it back to storage.

The storage system may further comprise additional vehicles arranged to move at the top level of the upper grid structure 20 and arranged to receive a storage bin from a storage cell at the top level of the upper grid structure.

The storage system may further comprise additional vehicles arranged to move at the top level of the lower grid structure 22 and arranged to receive a storage bin from a storage cell at the top level of the lower grid structure.

Each vehicle typically has two sets (pairs) of wheels that enable it to move horizontally on rails which extend along two axes on the top of each grid structure 20, 22. The axes may be perpendicular. This makes it possible for all vehicles to reach any position on the top of the relevant grid structure.

Each vehicle is equipped with a lift for picking up, carrying, and placing storage bins that are stored in the corresponding grid structure. The robot communicates with a control system via a wireless link and is automatically recharged when needed, typically at night.

The storage system may further comprise additional grid structures of storage cells. More particularly, the storage system may include 2, 3, 4, 5 or more grid structures of storage cells, each arranged on a separate vertical level.

The storage system may further comprise additional vehicles arranged to move at the top level of any possible further grid structure included in the system, e.g. a third grid structure, and arranged to receive a storage bin from a storage cell at the top level of that grid structure.

Each grid structure may, e.g. be constructed as an aluminium (or other possible materials) structure, organized in rectangular storage cells. Each storage cell has room for several storage bins that are stored on top of each other. Different configurations of height and shape are possible, making the grid structure able to surround pillars and other obstacles.

On the top of each grid structure 20, 22 there is arranged tracks in two dimensions, allowing the vehicles assigned for this particular grid to move.

A storage bin is the basic module in which goods are stored. The storage bin may, e.g., be embodied in two different heights and can be produced in different materials in order to achieve particular properties, such as polypropylene or high-density polyethylene. In a particular aspect, anti-static bins may be used for accommodating electronics components. By example, a bin may have length 600 mm×width 400 mm, with heights of 210 mm or 310 mm.

In an aspect, at least one of the grid structures may be a consolidation grid. A consolidation grid is a grid used for intermediate storing, e.g., for storing a plurality of bins that contain goods intended for a particular order.

Figure 3:
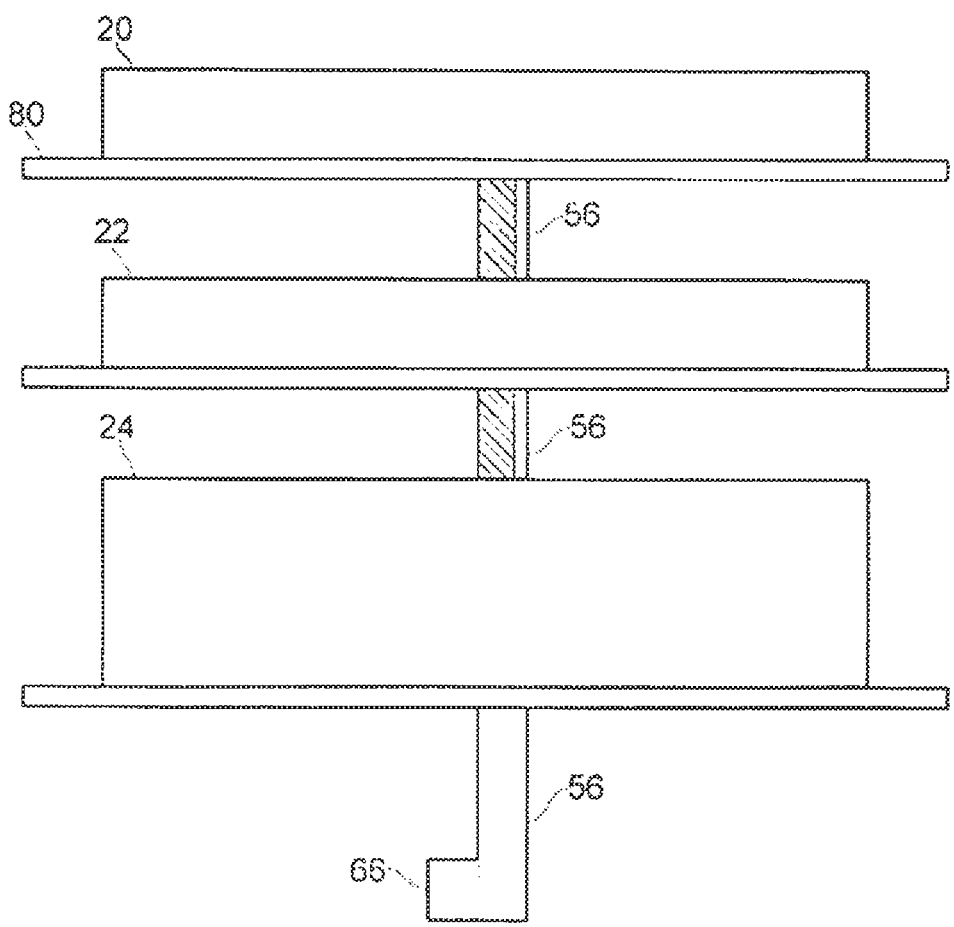
FIG. 3 is a schematic side elevation illustrating certain aspects of a storage system.

FIG. 3 is a schematic side elevation illustrating certain aspects of a storage system.

This embodiment of the storage system includes a first, upper grid structure of storage cells, arranged on an upper floor 80. Each storage cell is arranged to accommodate a vertical stack of storage bins. The first grid structure has a top level 20.

A first vehicle (not shown) is arranged to move at the top level 20 of the first grid structure and arranged to receive a storage bin from a storage cell at the top level 20. A plurality of such vehicles may be arranged on the top level 20 of the first grid structure.

At least one vertical bin lift device is arranged in the system. One such bin lift device has been shown at 56, although a plurality of bin lift devices may be employed. The bin lift device 56 is arranged to receive a bin from the vehicle at the top level of the first grid structure 20 and to convey the bin down in a vertical direction to a delivery station 66, which in this example is arranged at the ground floor in the building wherein the storage system is installed. The inter-grid bin lift device 56 is arranged to deliver bins to an operator at the delivery station 66 arranged on a ground floor 26 in a building. The delivery station 66 may also receive bins from the operator and deliver them to the inter-grid bin lift device 56.

The storage system further comprises a second, intermediate grid structure of storage cells on a different vertical level than the first grid structure. In this example the second, intermediate grid structure has a top level 22 and is arranged below the first grid structure.

The storage system further comprises a third, lower grid structure of storage cells on a different vertical level than the first grid structure and the second grid structure. In this example the third, lower grid structure has a top level 24 and is arranged below the second grid structure. The third grid structure may be a main storage grid structure.

Vehicles of the kind previously described are arranged to move at the top level of both the second and the third grid structure. They are arranged to receive a storage bin from a storage cell at the top level of the respective grid structure.

Each inter-grid bin lift device, such as the inter-grid bin lift device 56, is arranged to receive a storage bin from the vehicle at the top level of the first grid structure and to convey the storage bin in a vertical direction to the top level of the second grid structure. The inter-grid bin lift device 56 is further arranged to convey the storage bin in a vertical direction to the delivery station 66.

The inter-grid bin lift device 56 is further arranged to receive a storage bin from the vehicle at the top level of the second grid structure and to convey the storage bin in a vertical direction to the top level of the first grid structure.

The inter-grid bin lift device 56 is further arranged to receive a storage bin from the vehicle at the top level of any of the first, second or third grid structures and to convey the storage bin in a vertical direction to the top level of any one of the first, second or third grid structures.

The system may also include at least one additional inter-grid bin lift device, which if not necessarily connected to a delivery station, and which is arranged to receive a storage bin from the vehicle at the top level of any one of the first, second or third grid structures and to convey the storage bin in a vertical direction to the top level of any one of the first, second or third grid structures.

The system may also include bin lift devices such as the bin lift device 50 which do not extend between grids on different levels (i.e., not inter-grid bin lift devices), but which merely provides access from one particular grid to a delivery station 60.

Delivery station(s) may be installed on all sides of the grid structures, or even below the lowermost grid structure if the grid structure is on a higher vertical level than the delivery station. The delivery station may even be located at a level above the top of the uppermost grid structure.

When a vehicle delivers a storage bin to a bin lift, the bin lift exchanges this bin with the previously used bin and the vehicle returns it back to storage.

The storage system may further comprise additional vehicles arranged to move at the top level of the first grid structure 20 and arranged to receive a storage bin from a storage cell at the top level of the first grid structure.

The storage system may further comprise additional vehicles arranged to move at the top level of the second grid structure 22 and arranged to receive a storage bin from a storage cell at the top level of the second grid structure.

The storage system may further comprise additional vehicles arranged to move at the top level of any further grid structure, e.g. the third grid structure 24, and arranged to receive a storage bin from a storage cell at the top level of that grid structure.

The storage system may further comprise additional grid structures of storage cells. More particularly, the storage system may include 2, 3, 4, 5 or more grid structures of storage cells, each arranged on a separate vertical level.

Each grid structure may, e.g. be constructed as an aluminium (or other possible materials) structure, organized in rectangular storage cells. Each storage cell has room for several storage bins that are stored on top of each other. Different configurations of height and shape are possible, making the grid structure able to surround pillars and other obstacles.

On the top of each grid structure 20, 22, 24 there is arranged tracks in two dimensions, allowing the vehicles assigned for this particular grid to move.

A storage bin is the basic module in which goods are stored. The storage bin may, e.g., be embodied in two different heights and can be produced in different materials in order to achieve particular properties, such as polypropylene or high-density polyethylene. In a particular aspect, anti-static bins may be used for accommodating electronics components. By example, a bin may have length 600 mm×width 400 mm, with heights of 210 mm or 310 mm.

In an aspect, at least one of the grid structures may be a consolidation grid. A consolidation grid is a grid used for intermediate storing, e.g., for storing a plurality of bins that contain goods intended for a particular order.

Each vehicle has two sets of wheels that enable it to move horizontally on rails which extend along two axes on the top of each grid structure 20, 22, 24. The axes may be perpendicular. This makes it possible for all vehicles to reach any position on the top of the relevant grid structure.

Each vehicle is equipped with a lift for picking up, carrying, and placing storage bins that are stored in the corresponding grid structure. The robot communicates with a control system via a wireless link and is automatically recharged when needed, typically at night.

Figure 4:
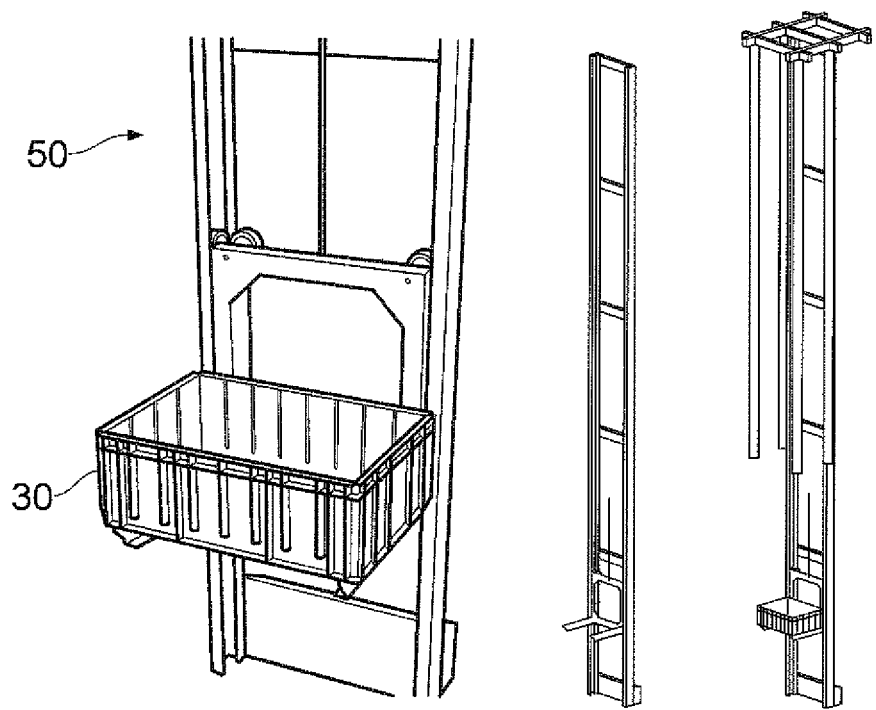
FIG. 4 is a schematic perspective view illustrating certain aspects of a bin lift device.

FIG. 4 is a schematic perspective view illustrating certain aspects of a bin lift device. The bin lift device 50 includes a movable support for a bin 30, the movable support being arranged to slide in a vertical frame which includes at least two, possibly four, vertical columns, which are arranged at corresponding corners of the bin when positioned to be supported by the movable support. The bin lift device is further arranged to be elevated or lowered by appropriate lifting means.

Figure 5:
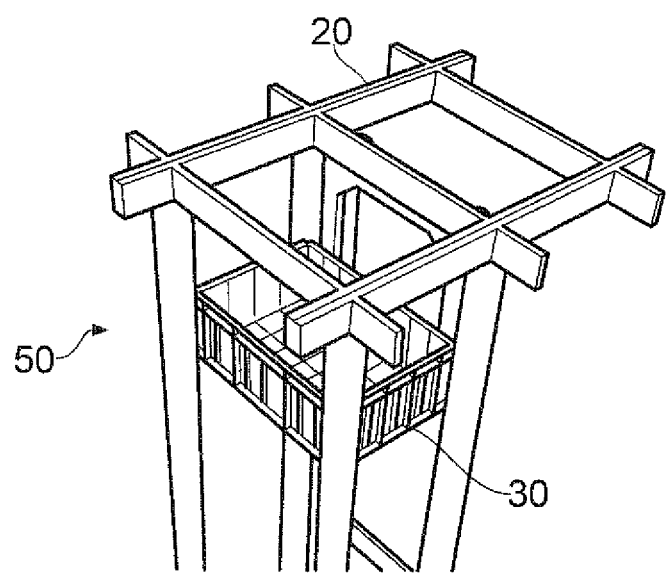
FIG. 5 is a schematic perspective view illustrating certain aspects of a bin lift device at the top of an upper grid structure.

FIG. 5 is a schematic perspective view illustrating certain aspects of a bin lift device 50 at the top of an upper grid structure. The upper ends of the columns of the vertical frames are interconnected by an upper framework constituting the upper level 20 of the grid structure. The upper framework has openings corresponding to the shape and size of the bin 30 that is lifted and lowered by the bin lift device 50.

Figure 6:
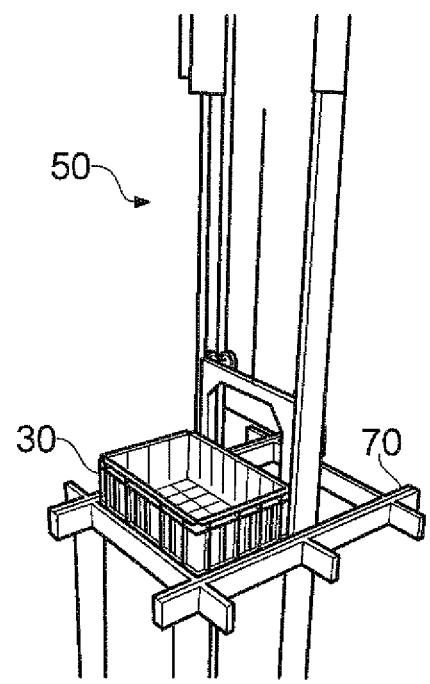
FIG. 6 is a schematic perspective view illustrating certain aspects of a bin lift device at the top of an intermediate grid structure.

FIG. 6 is a schematic perspective view illustrating certain aspects of a bin lift device at the top of an intermediate grid structure. The bin lift device 50 has features corresponding to those illustrated in FIG. 5, but the framework 70 constitutes the upper level 22 of an intermediate grid structure. Further, two columns of the bin lift device 50 extend further upwards to another grid structure at a higher level, e.g. the upper grid structure 20.

Figure 7:
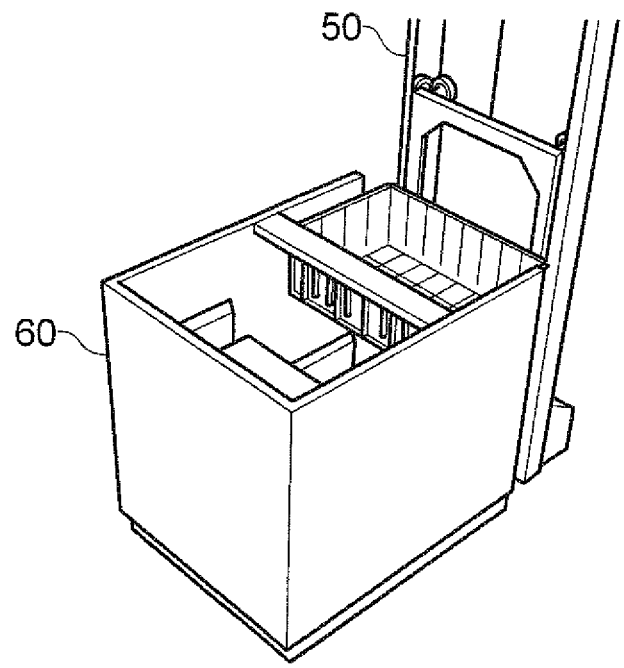
FIG. 7 is a schematic perspective view illustrating certain aspects of a bin lift device and a delivery station.

FIG. 7 is a schematic perspective view illustrating certain aspects of a bin lift device and a delivery station. The delivery station 60, or port, is arranged at the lower end of the bin lift device 50. The delivery station 60 serves the purpose of delivering a bin to a human operator of the system, and to receive bins from the operator. The delivery station may be arranged, e.g., at a ground floor.

Figure 8:
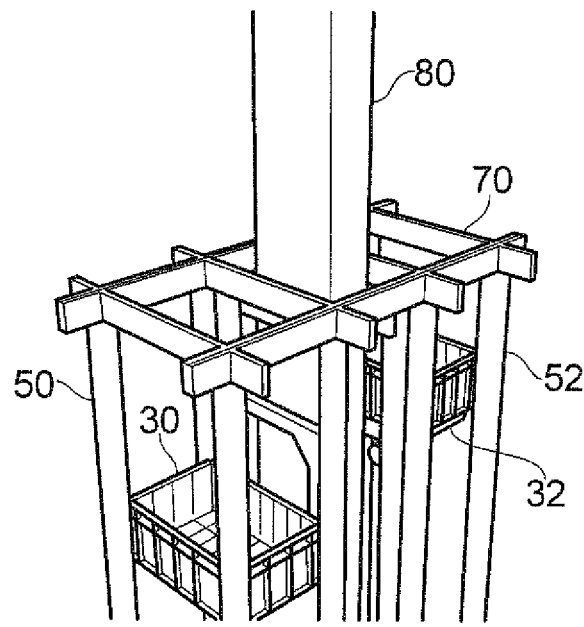
FIG. 8 is a schematic perspective view illustrating certain aspects of a twin bin lift device at the top of an upper grid structure.

FIG. 8 is a schematic perspective view illustrating certain aspects of a twin bin lift device at the top of an upper grid structure. The twin bin lift device includes two bin lift devices 50, 52 as already described with reference to the bin lift device 50 above, which may be arranged at opposite sides of a pillar, or constructional supporting column, 80.

Figure 9:
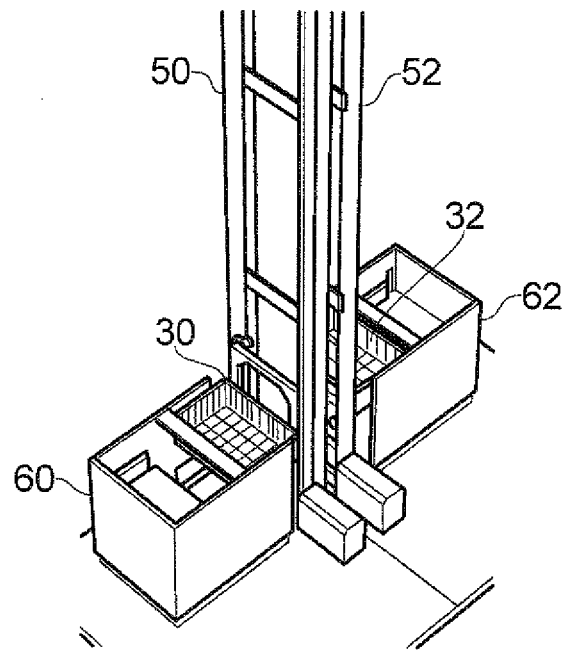
FIG. 9 is a schematic perspective view illustrating certain aspects of a twin bin lift device and two delivery stations.

FIG. 9 is a schematic perspective view illustrating certain aspects of a twin bin lift device and two delivery stations. The twin bin lift device includes two bin lift devices as already described with reference to FIG. 8, and two delivery stations 60, 62 arranged at opposite sides of the pillar, or constructional supporting column, 80.

Figure 10:
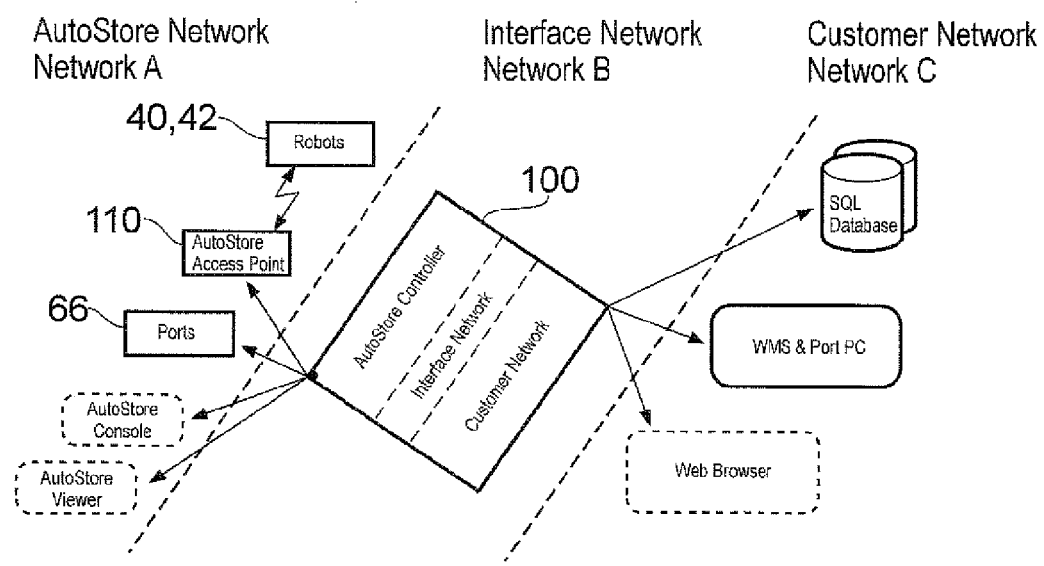
FIG. 10 is a schematic block diagram illustrating principles of network communication between storage system components.

FIG. 10 is a schematic block diagram illustrating principles of network communication between storage system components.

Each vehicles 40, 42 is remotely controlled, for instance by means of a wireless radio-based communication link. To this end, an access point 110 has been provided as a wireless router for providing communication between a control unit 100, e.g. a computer, and each vehicle 40, 42. The access point may be arranged in the vicinity of the system as a whole, or separate access points may be employed for different parts of the storage etc.

Also, each vehicle is provided with wireless communication means configured to provide wireless communication. Each vehicle is further provided with an electrical energy source, such as a rechargeable battery, in order to supply electrical effect to a motor or a plurality of motors which are also incorporated in each vehicle.

The control unit 100 is further operatively connected to control equipment controlling the delivery stations 66.

The control unit 100 is further operatively connected to console equipment and viewing equipment.

The control unit 100 includes an interface network and a customer network, which is configured, in use, to provide communication with a database such as an SQL database and further computing equipment or devices.

Figure 11:
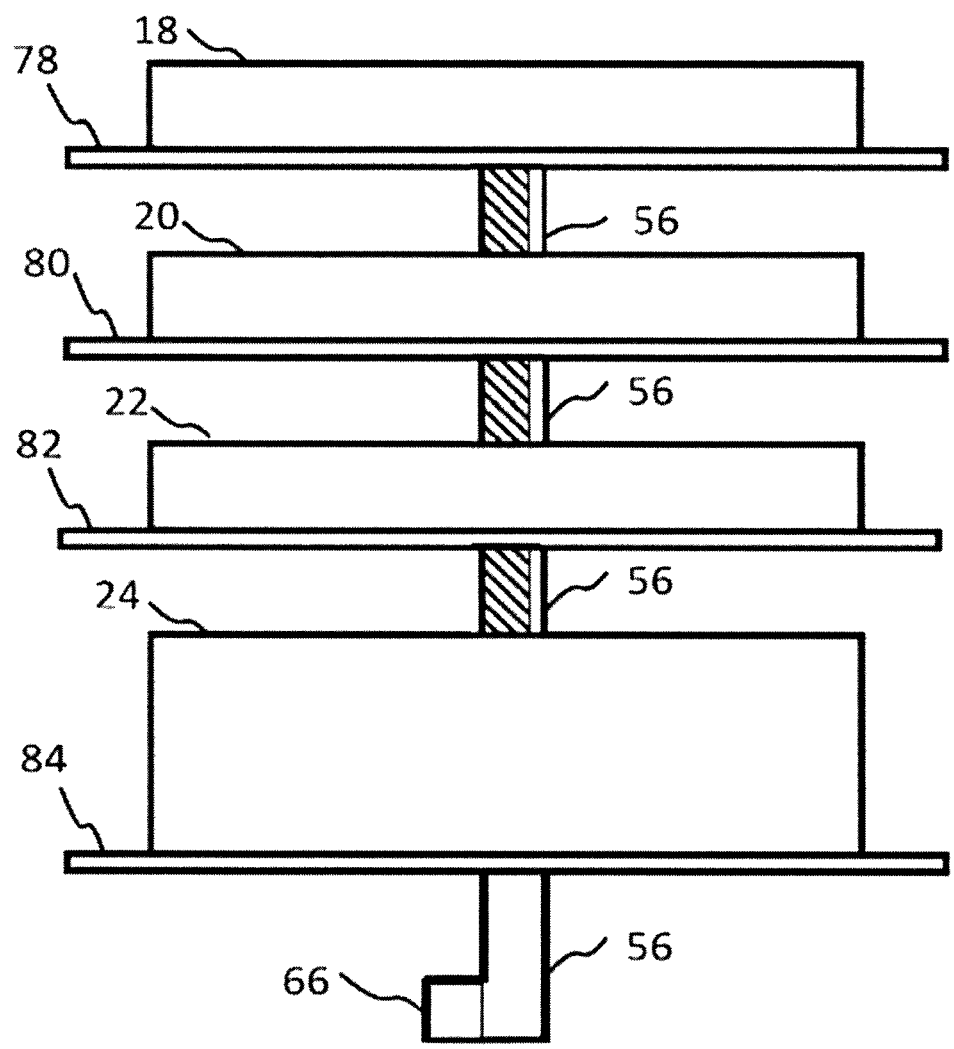
FIG. 11 is a schematic side elevation illustrating certain aspects of a storage system.

FIG. 11 is a schematic side elevation illustrating certain aspects of a storage system similar to FIG. 3.

This embodiment of the storage system includes a first, upper grid structure of storage cells, arranged on an upper floor 78. Each storage cell is arranged to accommodate a vertical stack of storage bins. The first grid structure has a top level 18.

In one or more embodiments, a first vehicle (not shown) is arranged to move at the top level 18 of the first grid structure and arranged to receive a storage bin from a storage cell at the top level 18. A plurality of such vehicles may be arranged on the top level 18 of the first grid structure.

At least one vertical bin lift device is arranged in the system. One such bin lift device has been shown at 56, although a plurality of bin lift devices may be employed. The bin lift device 56 is arranged to receive a bin from the vehicle at the top level of the first grid structure 18 and to convey the bin down in a vertical direction to a delivery station 66, which in this example is arranged at the ground floor in the building wherein the storage system is installed. The inter-grid bin lift device 56 is arranged to deliver bins to an operator at the delivery station 66 arranged on a ground floor 26 in a building. The delivery station 66 may also receive bins from the operator and deliver them to the inter-grid bin lift device 56.

In one or more embodiments, the storage system further comprises a second, intermediate grid structure of storage cells, arranged on a floor 80, the second grid structure being on a different vertical level than the first grid structure. In this example the second, intermediate grid structure has a top level 20 and is arranged below the first grid structure.

In one or more embodiments, the storage system further comprises a third intermediate grid structure of storage cells, arranged on a floor 82, the third grid structure being on a different vertical level than the first grid structure and the second grid structure. In this example the third grid structure has a top level 22 and is arranged below the second grid structure.

In one or more embodiments, the storage system further comprises a fourth, lower grid structure of storage cells, arranged on a floor 84, the fourth grid structure being on a different vertical level than the first grid structure, the second grid structure and the third grid structure. In this example the fourth, lower grid structure has a top level 24 and is arranged below the third grid structure. The fourth grid structure may be a main storage grid structure.

Vehicles of the kind previously described are arranged to move at the top level of the second, third and fourth grid structure 20, 22, 24. They are arranged to receive a storage bin from a storage cell at the top level of the respective grid structure.

In one or more embodiments, each inter-grid bin lift device, such as the inter-grid bin lift device 56, is arranged to receive a storage bin from the vehicle at the top level of the first grid structure and to convey the storage bin in a vertical direction to the top level of the second grid structure. The inter-grid bin lift device 56 is further arranged to convey the storage bin in a vertical direction to the delivery station 66.

In one or more embodiments, the inter-grid bin lift device 56 is further arranged to receive a storage bin from the vehicle at the top level of the second grid structure and to convey the storage bin in a vertical direction to the top level of the first grid structure.

In one or more embodiments, the inter-grid bin lift device 56 is further arranged to receive a storage bin from the vehicle at the top level of any of the first, second, third or fourth grid structures and to convey the storage bin in a vertical direction to the top level of any one of the first, second, third or fourth grid structures.

The system may also include at least one additional inter-grid bin lift device, which if not necessarily connected to a delivery station, and which is arranged to receive a storage bin from the vehicle at the top level of any one of the first, second, third or fourth grid structures and to convey the storage bin in a vertical direction to the top level of any one of the first, second, third or fourth grid structures.

The system may also include bin lift devices such as the bin lift device 50 which do not extend between grids on different levels (i.e., not inter-grid bin lift devices), but which merely provides access from one particular grid to a delivery station 60.

In one or more embodiments, delivery station(s) may be installed on all sides of the grid structures, or even below the lowermost grid structure if the grid structure is on a higher vertical level than the delivery station. The delivery station may even be located at a level above the top of the uppermost grid structure.

When a vehicle delivers a storage bin to a bin lift, the bin lift exchanges this bin with the previously used bin and the vehicle returns it back to storage.

The storage system may further comprise additional vehicles arranged to move at the top level of the first grid structure 18 and arranged to receive a storage bin from a storage cell at the top level of the first grid structure.

The storage system may further comprise additional vehicles arranged to move at the top level of the second grid structure 20 and arranged to receive a storage bin from a storage cell at the top level of the second grid structure.

The storage system may further comprise additional vehicles arranged to move at the top level of any further grid structure, e.g. the third grid structure 22 and/or the fourth grid structure 24, and arranged to receive a storage bin from a storage cell at the top level of that grid structure.

On the top of each grid structure 18, 20, 22, 24 there is arranged tracks in two dimensions, allowing the vehicles assigned for this particular grid to move.

Each vehicle may have two sets of wheels that enable it to move horizontally on rails which extend along two axes on the top of each grid structure 18, 20, 22, 24. The axes may be perpendicular. This makes it possible for all vehicles to reach any position on the top of the relevant grid structure.

Each vehicle is equipped with a lift for picking up, carrying, and placing storage bins that are stored in the corresponding grid structure. The robot communicates with a control system via a wireless link and is automatically recharged when needed, typically at night.

The detailed description has been presented above for the purpose of understanding the principles of the present invention. It will be understood that the invention is not limited to the particular embodiments described herein. Various modifications, rearrangements and substitutions may readily become apparent to those skilled in the art without departing from the scope of the invention, which is defined by the following claims and their equivalents.

The invention claimed is:

1. A storage system, comprising
a first grid structure of storage cells, each storage cell of the first grid structure being arranged to accommodate a vertical stack of storage bins, the first grid structure having a top level,
a first vehicle, arranged to move horizontally at the top level of the first grid structure, wherein the first vehicle is on top of rails that are provided in the top level of the first grid structure,
a second grid structur of storage cells, each storage cell of the second grid structure being arranged to accommodate a vertical stack of storage bins, the second grid structure being arranged at a different vertical level than the first grid structure,
a second vehicle, arranged to move horizontally at the top level of the second grid structure, wherein the second vehicle is on top of rails that are provided in the top level of the second grid structure,
a third grid structure of storage cells, each storage cell of the third grid structure being arranged to accommodate a vertical stack of storage bins, the third grid structure being arranged on a different vertical level than the first grid structure and the second grid structure,
a third vehicle, arranged to move horizontally at the top level of the third grid strucutre, wherein the third vehicle is on top of rails that are provided in the top level of the third grid structure,
a bin lift device, arranged to receive a bin from said vehicles and convey the bin, without said vehicles, in a vertical direction between the top levels of the first grid structure, the second grid structure, the third grid structure, and a delivery station,
wherein the first vehicle is further arranged to receive a storage bin from a storage cell at the top level of the first grid structure and to deliver the storage bin to the bin lift device, wherein the bin lift device is arranged to receive the storage bin from the first vehicle, and wherein the bin lift device is further arranged to convey the storage bin, without the first vehicle, in a vertical direction from the top level of the first grid structure to the delivery station,
wherein the second vehicle is further arranged to receive a storage bin from a storage cell at the top level of the second grid structure and to deliver the storage bin to the bin lift device, wherein the bin lift device is arranged to receive the storage bin from the second vehicle, and wherein the bin lift device is further arranged to convey the storage bin, without the second vehicle, in a vertical direction from the top level of the second grid structure to the delivery station,
wherein the third vehicle is further arranged to receive a storage bin from a storage cell at the top level of the third grid structure and to deliver the storage bin to the bin lift device, wherein the bin lift device is arranged to receive the storage bin from the third vehicle, and wherein the bin lift device is further arranged to convey the storage bin, without the third vehicle, in a vertical direction from the top level of the third grid structure to the delivery station, and
wherein the second grid structure is arranged below the first grid structure, and the third grid structure is arranged below the second grid structure.

2. The storage system according to claim 1, wherein the first and second grid structures are arranged on separate floors or mezzanines in a building.

3. The storage system according to claim 1, wherein the delivery station is arranged below the level of the second grid structure.

4. The storage system according to claim 3, wherein the delivery station is arranged on the ground floor in a building.

5. The storage system according to claim 1, further comprising additional vehicles arranged to move at the top level of the first grid structure and arranged to receive a storage bin from a storage cell at the top level of the first grid structure.

6. The storage system according to claim 1, further comprising additional vehicles arranged to move at the top level of the second grid structure and arranged to receive a storage bin from a storage cell at the top level of the second grid structure.

7. The storage system according to claim 1, further comprising at least one additional grid structure of storage cells, arranged on a vertical level different from the vertical levels of other grid structures in the system.

8. The storage system according to claim 7, wherein the first grid structure is an upper grid structure and the second grid structure is an intermediate grid structure, and wherein the at least one additional grid structure includes a lower grid structure.

9. The storage system according to claim 7, wherein at least one of the grid structures is a consolidation grid, wherein the consolidation grid is a grid for storing a plurality of bins.

10. The storage system according to claim 1, wherein the bin lift device is further arranged to receive a storage bin from the second vehicle at the top level of the second grid structure and to convey the storage bin in a vertical direction to the top level of the first grid structure.

11. The storage system according to claim 1, further comprising at least one additional bin lift device, arranged to receive a storage bin from the first vehicle at the top level of the first grid structure and to convey the storage bin in a vertical direction to the top level of the second grid structure.

12. The storage system according to claim 1, further comprising a control unit and network communication devices configured to provide wireless communication between the control unit and said vehicles.

* * * * *